United States Patent
Nam et al.

(10) Patent No.: US 10,286,865 B2
(45) Date of Patent: May 14, 2019

(54) CRASH BOX FOR VEHICLE

(71) Applicants: Hyundai Motor Company, Seoul (KR); Kia Motors Corp., Seoul (KR); Hanwha Advanced Materials Corporation, Sejong (KR); Automobile Industrial Ace, Ansan-si (KR)

(72) Inventors: Sang Wook Nam, Daejeon (KR); Hyun Gyung Kim, Hwaseong-si (KR); Seok Jae Park, Anyang-si (KR); Jeong Du Noh, Osan-si (KR); Ki Jo Jeong, Ansan-si (KR)

(73) Assignees: Hyundai Motor Company, Seoul (KR); Kia Motors Corp., Seoul (KR); Hanwha Advanced Materials Corporation, Sejong (KR); Automobile Industrial Ace, Ansan-si (KR)

( * ) Notice: Subject to any disclaimer, the term of this patent is extended or adjusted under 35 U.S.C. 154(b) by 0 days.

(21) Appl. No.: 15/705,840

(22) Filed: Sep. 15, 2017

(65) Prior Publication Data
US 2018/0093626 A1    Apr. 5, 2018

(30) Foreign Application Priority Data
Oct. 4, 2016 (KR) .......................... 10-2016-0127336

(51) Int. Cl.
*B60R 19/34* (2006.01)
*F16F 7/00* (2006.01)
*F16F 7/12* (2006.01)

(52) U.S. Cl.
CPC .............. *B60R 19/34* (2013.01); *F16F 7/003* (2013.01); *F16F 7/12* (2013.01)

(58) Field of Classification Search
CPC .............. B60R 19/34; F16F 7/12; F16F 7/003
(Continued)

(56) References Cited

U.S. PATENT DOCUMENTS 5,314,229 A * 5/1994 Matuzawa .............. B60R 19/34
188/377
5,876,077 A * 3/1999 Miskech ................. B60R 19/18
293/132

(Continued)

FOREIGN PATENT DOCUMENTS

JP     2013-154663 A    8/2013
KR     20-0119213 Y1   10/1998
(Continued)

*Primary Examiner* — Jason S Morrow
*Assistant Examiner* — E Turner Hicks
(74) *Attorney, Agent, or Firm* — Morgan, Lewis & Bockius LLP (57) ABSTRACT

A crash box for a vehicle, which mediates a back beam and a side member disposed in a width direction of the vehicle and absorbs crash energy when a crash occurs, may include a connecting body including a front coupling portion coupled to the back beam, a pair of side connecting portions bent from the front coupling portion to face each other, and a rear coupling portion extending from an end portion of each of the side connecting portions by being bent to be coupled to the side member; and a pair of connecting plates coupled to open upper and lower end portions of the connecting body, respectively.

10 Claims, 9 Drawing Sheets

(58) Field of Classification Search
USPC .................................. 293/132, 133, 155
See application file for complete search history.

(56) References Cited

U.S. PATENT DOCUMENTS

| | | | | |
|---|---|---|---|---|
| 6,648,385 | B2* | 11/2003 | Frank | ............... B60R 19/34 |
| | | | | 293/120 |
| 6,814,381 | B1* | 11/2004 | Frank | ............... B60R 19/34 |
| | | | | 293/120 |
| 8,047,588 | B2* | 11/2011 | Fang | ................. F16F 7/12 |
| | | | | 293/132 |
| 8,662,546 | B2* | 3/2014 | Kizaki | ............ B60R 19/18 |
| | | | | 293/133 |
| 2014/0125073 | A1* | 5/2014 | Yamada | ............ B60R 19/34 |
| | | | | 293/133 |

FOREIGN PATENT DOCUMENTS

| | | |
|---|---|---|
| KR | 10-0579875 B1 | 5/2006 |
| KR | 10-2011-0071250 A | 6/2011 |
| KR | 10-2013-0006098 A | 1/2013 |
| KR | 10-2013-0065136 A | 6/2013 |
| KR | 10-1683395 B1 | 11/2016 |

\* cited by examiner

FIG. 1

Inward  Outward

CRASH BOX FOR VEHICLE

CROSS-REFERENCE(S) TO RELATED APPLICATIONS

The present application claims priority to Korean Patent Application No. 10-2016-0127336, filed on Oct. 4, 2016, the entire contents of which is incorporated herein for all purposes by this reference.

BACKGROUND OF THE INVENTION

Field of the Invention

The present invention relates generally to a crash box for a vehicle. More particularly, the present invention relates to a crash box for a vehicle, in which the crash box is disposed between a side member and a back beam of a bumper constituting a vehicle body, thereby absorbing crash energy when a crash occurs.

Description of Related Art

Generally, a bumper of a vehicle is provided at a front side and a rear side of the vehicle to protect a vehicle body and occupants when a front or rear crash occurs and further protects the hood, the engine, and various devices mounted in an engine compartment.

The bumper includes: a bumper cover forming an appearance of the bumper; an energy absorber that reduces impact when a crash occurs and has a shape recovery function after the collision; and a back beam (referred to as a bumper beam) supporting the energy absorber and being disposed at the side member of a vehicle body.

Figure 1:
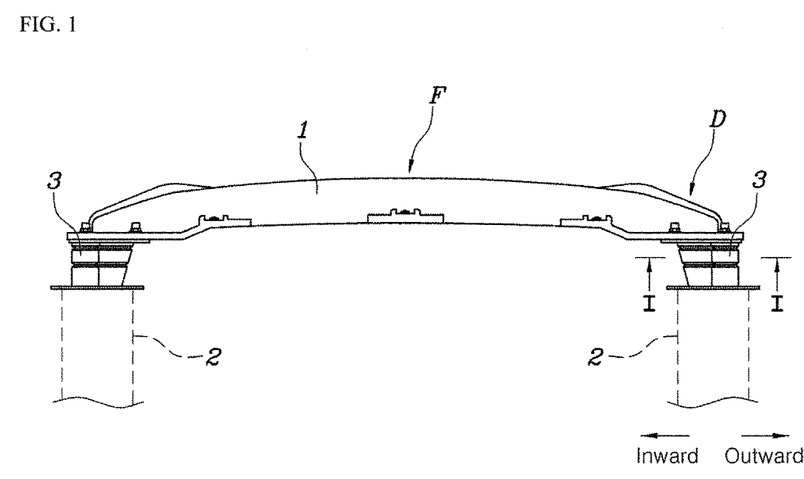
FIG. 1 is a view showing an installation of a crash box between a back beam and a side member of a conventional bumper.

FIG. 1 is a view showing a crash box between a back beam and a side member of a conventional bumper.

As shown in FIG. 1, generally, a crash box 3 is configured to absorb crash energy occurring when a crash occurs by being disposed between a back beam 1 and a side member 2.

The crash box 3 is configured to absorb crash energy by being compressively strained in an axial direction (forward and backward direction) in a case where the crash energy is applied to the bumper. It is preferred that the crash box is configured to minimize the strain of the side member 2 to minimize repair cost.

Further, the crash box needs to be configured to satisfy the regulations of the Research Council for Automobile Repairs (RCAR), which is the representative regulation agency in the automobile industrial field.

Referring to FIG. 1, in a conventional RCAR bumper test, there existed only a corner test that assesses a compressive strain performance by applying an impact D at a diagonal direction to the back beam 1 of a vehicle. However, recently a center test has been added which assesses a load support performance by applying an impact F at an axial direction of a vehicle to a middle portion of the back beam 1.

Generally, the crash box 3 includes: front and rear coupling portions 130 coupled to the back beam 1 and the side member 2, respectively; and an intermediate connecting portion, wherein the intermediate connecting portion includes a plurality of intermediate connecting pieces that are connected to each other.

Figure 2:
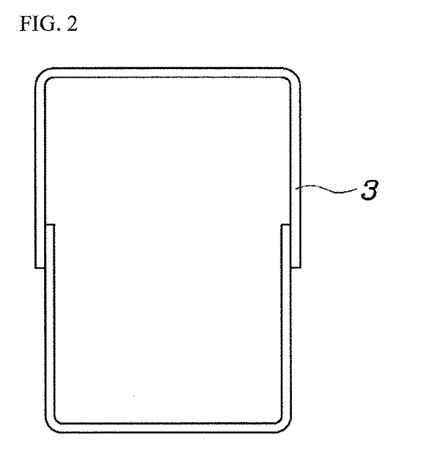
FIG. 2 is a sectional view taken along line I-I of FIG. 1, showing an intermediate connecting portion with a quadrangular cross section according to a conventional crash box.
Figure 3:
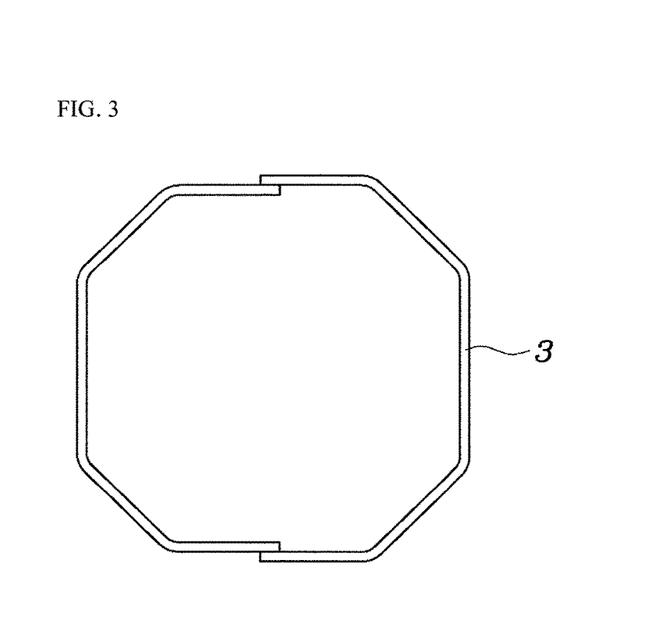
FIG. 3 is a sectional view showing an intermediate connecting portion with an octagonal cross section according to another conventional crash box.

FIG. 2 is a sectional view taken along line I-I of FIG. 1, showing an intermediate connecting portion with a quadrangular cross section according to a conventional crash box; and FIG. 3 is a sectional view showing an intermediate connecting portion with an octagonal cross section according to another conventional crash box.

Generally, the crash box is made of a steel material, wherein as shown in FIG. 2 and FIG. 3, an overlap portion is provided for wielding a plurality of intermediate connecting pieces to form the intermediate connecting portion.

Thereby, the conventional crash box results in not only an unnecessary weight increase and cost increase, but also tearing when a crash occurs, or it is not possible to mass-produce due to difficult molding.

Further, when the crash box 3 is formed to have an octagonal cross section, it is advantageous for a compressive strain, but it is disadvantageous in supporting the load, and thus it does not efficiently respond to an RCAR center test. On the contrary, when the crash box 3 is formed to have a quadrangular cross section, it is advantageous in supporting the load and thus it efficiently responds to the RCAR center test, but it is disadvantageous for the compressive strain and thus it does not efficiently respond to the RCAR corner test.

Accordingly, it is required to develop a crash box having an optimum shape that is advantageous in responding to both the RCAR corner test and RCAR center test.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a crash box for a vehicle, which is configured for satisfying both a RCAR corner test and a RCAR center test by optimizing a sectional shape, and further is configured for realizing a weight reduction.

The present invention is further intended to propose a crash box for a vehicle, which enables mass production by facilitating assembly with excellent formability.

To achieve the above object, According to various aspects of the present invention, there is provided a crash box for a vehicle, which mediates a back beam and a side member disposed in a width direction of the vehicle and configured to absorb crash energy when a crash occurs. The crash box may include a connecting body including a front coupling portion coupled to the back beam, a pair of side connecting portions bent from the front coupling portion to face each other, and a rear coupling portion extending from an end portion of each of the side connecting portions by being bent to be coupled to the side member; and a pair of connecting plates coupled to open upper and lower end portions of the connecting body, respectively.

Each of the side connecting portions may be in a trapezoidal shape, with a width thereof gradually increasing from the front coupling portion to the rear coupling portion.

Each of the connecting plates is formed to be in a shape corresponding to the open upper and lower end portions of the connecting body, wherein the front and opposite side end portions thereof are respectively coupled to the front coupling portion and the pair of side connecting portions.

Each of the connecting plates may be provided with an overlap portion that is formed by being bent and extending from each of opposite sides of the connecting plate to come into contact with an internal surface of an associated side connecting portion.

The overlap portion is in a trapezoidal shape, with a width thereof gradually increasing from the front coupling portion to the rear coupling portion.

The overlap portion may include a rear bent surface formed by being bent and extending toward the rear coupling portion to come into contact with a rear surface of the rear coupling portion.

The overlap portion may include: a first overlap portion coming into contact with the side connecting portion that is disposed toward a center of the width direction of the vehicle; and a second overlap portion coming into contact with the side connecting portion that is disposed toward the outside of the vehicle, wherein an area of the first overlap portion is greater than an area of the second overlap portion.

Each of the connecting plates is provided with a reinforcing protrusion configured to protrude from the front coupling portion toward the rear coupling portion wherein the reinforcing protrusions of the connecting plates face each other in one direction.

Each of the side connecting portions may be provided with a guide protrusion that is adjacent to the front coupling portion and protrudes in the width direction of the vehicle, to guide the strain.

The connecting body may be provided with insertion portions that are formed by being bent and extending at the upper and lower end portions of the connecting body, respectively, to form insertion slits for allowing front end portions of the connecting plates to be inserted thereto.

The connecting plates may be integrally formed on sides where the side connecting portions are not connected to the front coupling portion, to be bent to face each other.

According to an exemplary embodiment of the present invention, it is possible to efficiently respond to both a RCAR corner test and a RCAR center test, and further it is possible to improve fuel efficiency of a vehicle through weight reduction.

Further, it is possible to enable mass production by facilitating forming and assembly with a simple structure.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
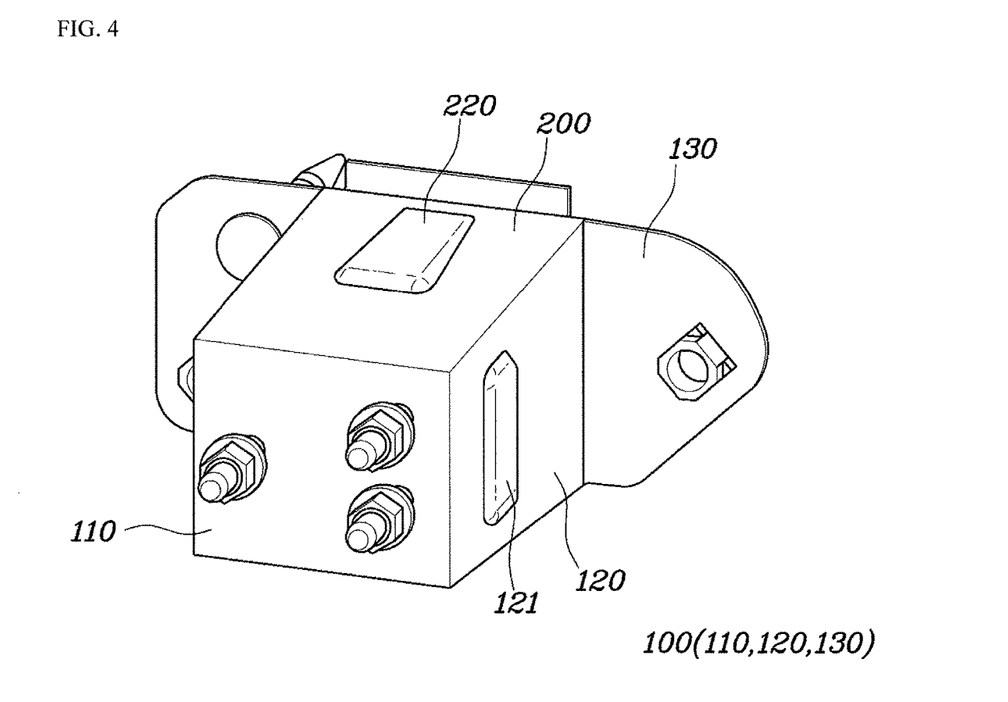
FIG. 4 is a perspective view showing a crash box for a vehicle according to various exemplary embodiments of the present invention.
Figure 5:
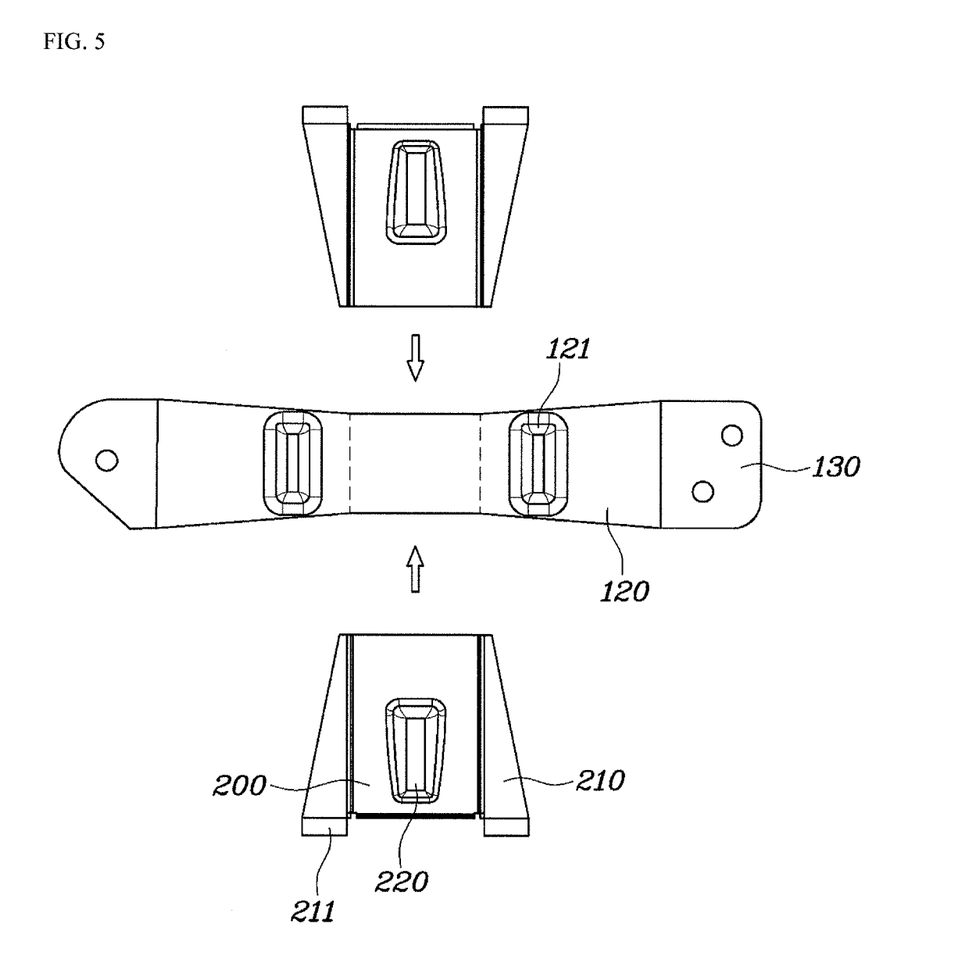
FIG. 5 is an exploded view showing a crash box for a vehicle according to an exemplary embodiment of the present invention.

FIG. 4 is a perspective view showing a crash box for a vehicle according to various exemplary embodiments of the present invention; and FIG. 5 is an exploded view showing a crash box for a vehicle according to an exemplary embodiment of the present invention.

As shown in FIG. 4 and FIG. 5, a crash box for a vehicle according to an exemplary embodiment of the present invention, which connects a back beam 1 and a side member 2 by being disposed at opposite sides of the back beam 1 in a width direction of the vehicle, and configured to absorb crash energy when a crash occurs crash energy, includes a connecting body 100 and a pair of connecting plates 200 that are respectively coupled to upper surface and lower end portions of the connecting body 100.

The connecting body 100 according to an exemplary embodiment of the present invention may include a front coupling portion 110 coupled to a rear surface of the back beam 1; a pair of side connecting portions 120 being bent and extending respectively from opposite sides of the front coupling portion 110 to face each other; and a rear coupling portion 130 coupled to a front surface of the side member 2 by being bent and extending from an end portion of each of the side connecting portions 120 in parallel with the front coupling portion 110.

The front coupling portion 110 is formed in a quadrangular shape, and is coupled to the back beam 1 in a bolting manner. A pair of side connecting portions 120 are bent and extend respectively from opposite sides of the front coupling portion 110 to the front surface of the side member to face each other, wherein a shape of the side connecting portion may be in a trapezoidal shape, and a width of which gradually increases toward the side member 2.

Here, each of the side connecting portions 120 is provided with a guide protrusion 121 that is adjacent to the front coupling portion 110 and protrudes in the width direction of the vehicle.

Accordingly, when an impact occurs due to a crash, etc., a portion without the guide protrusion 121, namely a portion having a wide width, is strained so that the amount of impact energy absorbed can be increased, and further it is possible to prevent rotational distortion by guiding a portion that is to be strained.

The rear coupling portion 130 may be coupled to the front surface of the side member 2 in a bolting manner by being bent and extending from each end portion of the side connecting portions 120 to be in parallel with the front surface of the side member 2.

Here, the connecting body may further include a guide pin that guides an assembly position when the rear coupling portion 130 is assembled with the side member 2, wherein the guide pin is configured to be inserted into a guide hole formed in the side member 2, regulating an assembly position of the crash box for a vehicle according to an exemplary embodiment of the present invention.

As described above, the connecting body 100 according to an exemplary embodiment of the present invention may be provided in a polyhedral shape having an internal volume with upper, lower, and rear end portions being open by bending the side connecting portions 120 and the rear coupling portion 130 after integrally forming the front coupling portion 110, a pair of side connecting portions 120, and the rear coupling portion 130.

Accordingly, it is possible to improve the formability of the connecting body 100 and facilitate assembly, facilitating mass production and improving productivity.

Here, the connecting body 100 that is provided by bending the side connecting portions 120 and the rear coupling portion 130 is coupled to a pair of connecting plates 200 at the open upper and lower end portions thereof to ensure the rigidity against an impact including a crash.

The connecting plate 200 is formed to be in a shape corresponding to the open upper and lower end portions of the connecting body 100, and the connecting plate may be coupled to the connecting body 100 by wielding means.

Figure 6:
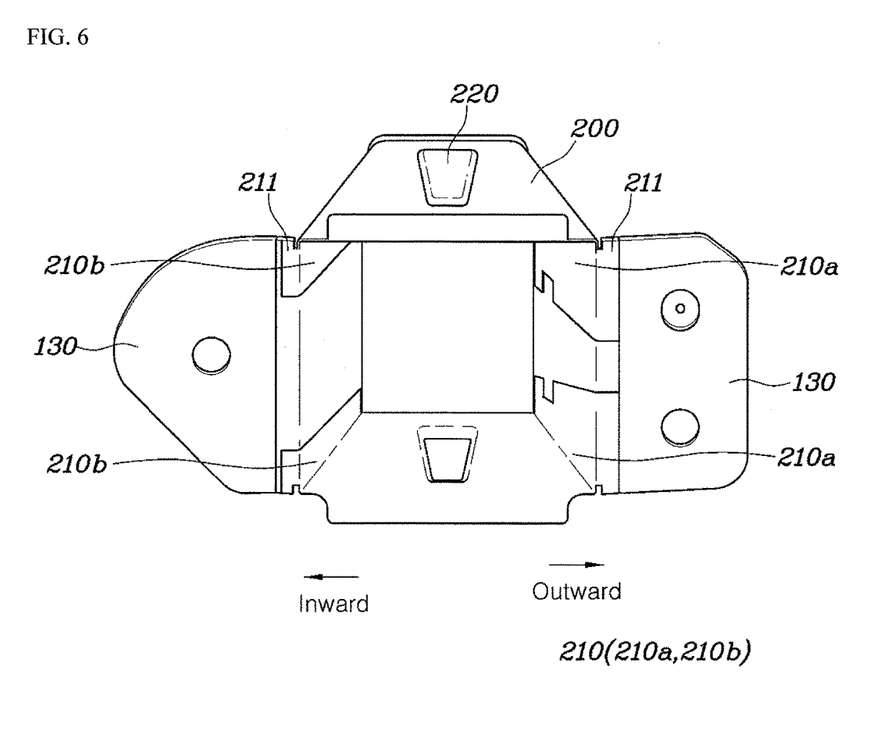
FIG. 6 is a perspective view showing an overlap portion according to an exemplary embodiment of the present invention.

FIG. 6 is a perspective view showing an overlap portion according to an exemplary embodiment of the present invention.

As shown in FIG. 6, the connecting plate 200, according to an exemplary embodiment of the present invention, is formed with an overlap portion 210 that is attached to an internal surface of the side connecting portion 120 by being bent and extending from a point coming into contact with the side connecting portion 120.

Accordingly, the overlap portion 210 is configured as a reinforcement of the side connecting portion 120, so it is possible to improve a crash performance by reinforcing the rigidity of the side connecting portion 120 when a crash occurs.

Here, the overlap portion 210 according to an exemplary embodiment of the present invention may be formed to be in a trapezoidal shape, a width of which gradually increases from the front coupling portion 110 to the rear coupling portion 130.

The overlap portion 210, according to an exemplary embodiment of the present invention, may include a first overlap portion 210a coming into close contact with the side connecting portion 120 and disposed toward a center of the width direction of the back beam 1; and a second overlap portion 210b coming into close contact with the side connecting portion 120 and disposed towards the outside, wherein a width of the first overlap portion 210a is wider than that of the second overlap portion 210b.

Figure 7A:
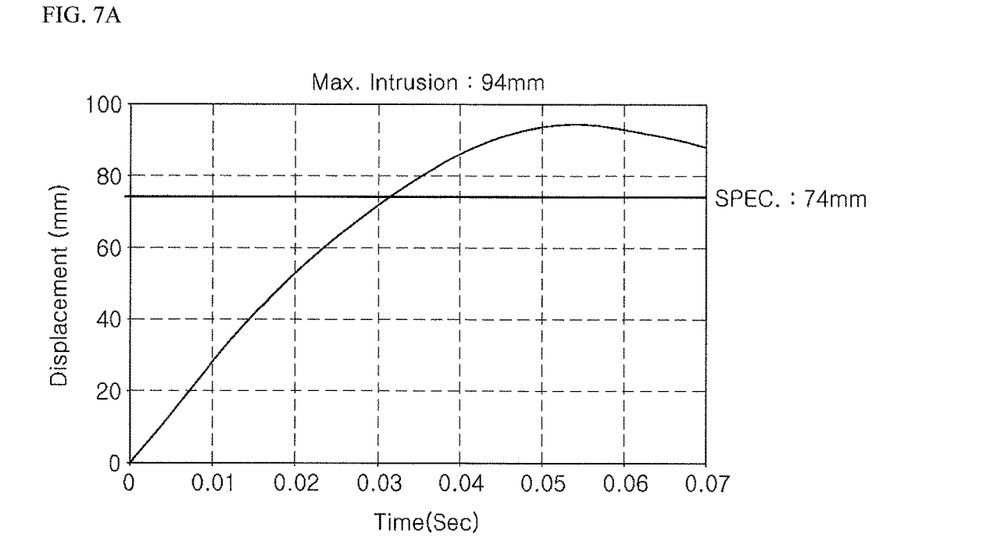
FIG. 7A and FIG. 7B are graphs showing a strain amount of a conventional crash box when a crash occurs.
Figure 7B:
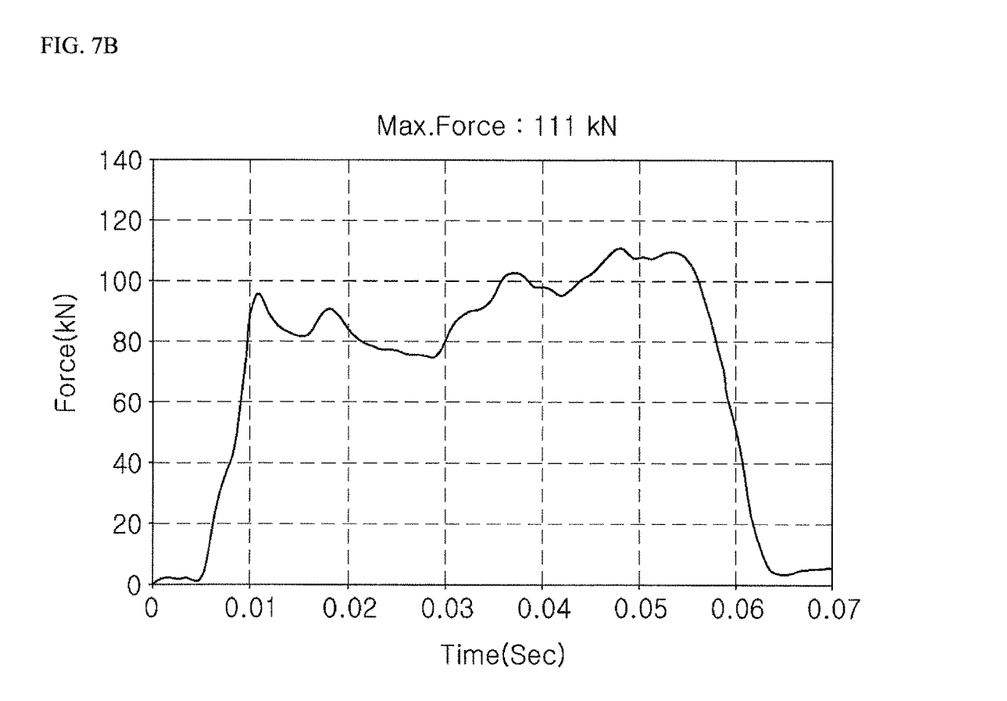
Figure 8:
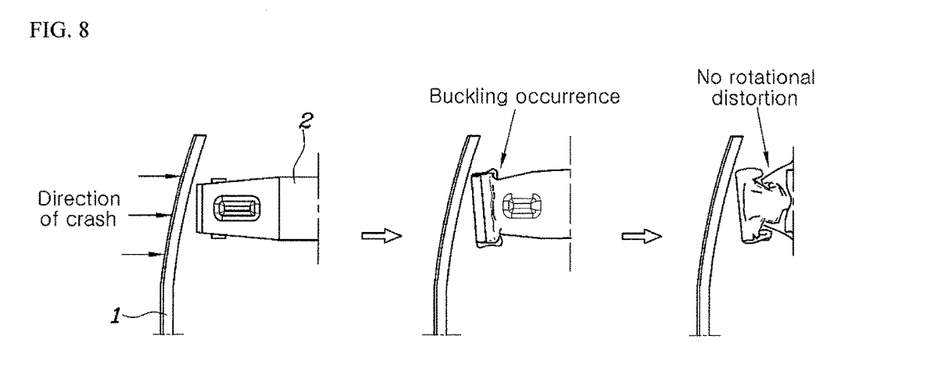
FIG. 8 is a view showing strain of a crash box for a vehicle according to an exemplary embodiment of the present invention.
Figure 9A:
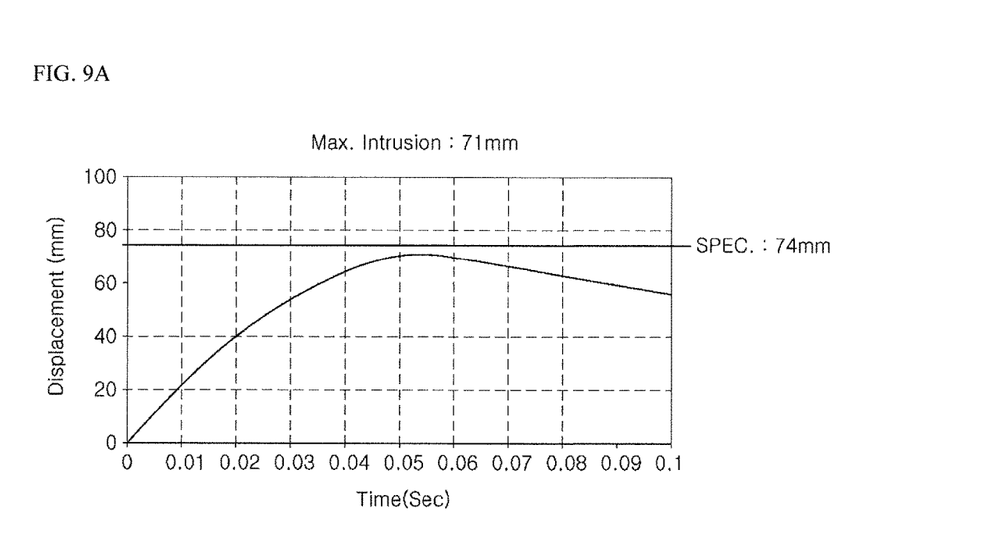
FIG. 9A and FIG. 9B are graphs showing a strain amount of a crash box for a vehicle according to an exemplary embodiment of the present invention when a crash occurs.
Figure 9B:
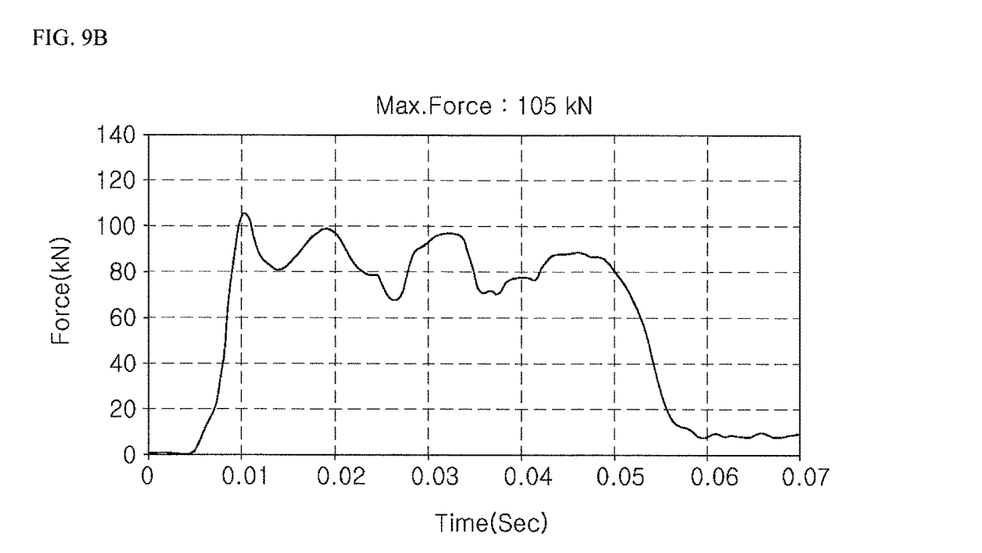

FIG. 7A and FIG. 7B are graphs showing a strain amount of a conventional crash box when a crash occurs; FIG. 8 is a view showing strain of a crash box for a vehicle according to an exemplary embodiment of the present invention; and FIG. 9A and FIG. 9B are graphs showing a strain amount of a crash box for a vehicle according to an exemplary embodiment of the present invention when a crash occurs.

As shown in FIG. 7A, FIG. 7B, and FIG. 8, according to the exemplary embodiment of the present invention, the side connecting portion 120 that is attached with the first overlap portion 210a and disposed toward the center of the width direction of the vehicle has a higher rigidity than the side connecting portion 120 that is attached with the second overlap portion 210b and disposed towards the outside, whereby the rigidity is formed asymmetrically in the width direction of the back beam 1 to induce buckling, so it is possible to improve the impact absorption performance.

To be more specific, generally, to improve the impact absorption performance without rotational distortion, the crash box should be configured wherein a front portion thereof absorbs the impact while buckling. The conventional crash box is problematic in that when a crash occurs, the internal side of the conventional crash box, to which a larger impact is applied than the external side thereof, is firstly strained due to a shape of the back beam 1, whereby a rotational distortion occurs and the impact absorption performance deteriorates.

According to the exemplary embodiment of the present invention, an asymmetrical structure is formed by varying the widths of the first and second overlap portions 210a and 210b that are disposed at the internal and external side connecting portions, inducing buckling, and thus it is possible to prevent rotational distortion.

As shown in FIG. 7 and FIG. 9, as a result of a crash analysis experiment under the uniform conditions, the conventional crash box strains to a maximum of 94 mm with the strain amount exceeding a reference value of 74 mm as the rotational distortion is generated. On the contrary, the crash box for a vehicle according to an exemplary embodiment of the present invention has a maximum strain amount of 71 mm, which is smaller than the reference value of 74 mm.

Further, the overlap portion 210 according to an exemplary embodiment of the present invention may further include a rear bent surface 211 that is disposed between the rear coupling portion 130 and the side member 2 by being bent toward the rear coupling portion 130, to be locked by both the rear coupling portion 130 and the side member 2 when the rear coupling portion 130 is fixed to the side member 2.

Accordingly, it is possible to improve the ease of assembly and durability of the crash box for a vehicle by making the coupling of the connecting body 100 and a pair of connecting plates 200 provided separately from the connecting body 100 stronger.

The connecting plate 200 according to an exemplary embodiment of the present invention is formed with a reinforcing protrusion 220 that protrudes from the back beam 1 toward the side member 2. Accordingly, rigidity can be improved in a direction of impact.

Here, a shape of the reinforcing protrusion 220 is not limited to the above described shape, and the reinforcing protrusion 220 may be formed in various shapes or a groove shape configured for improving rigidity in the direction of impact.

Figure 10:
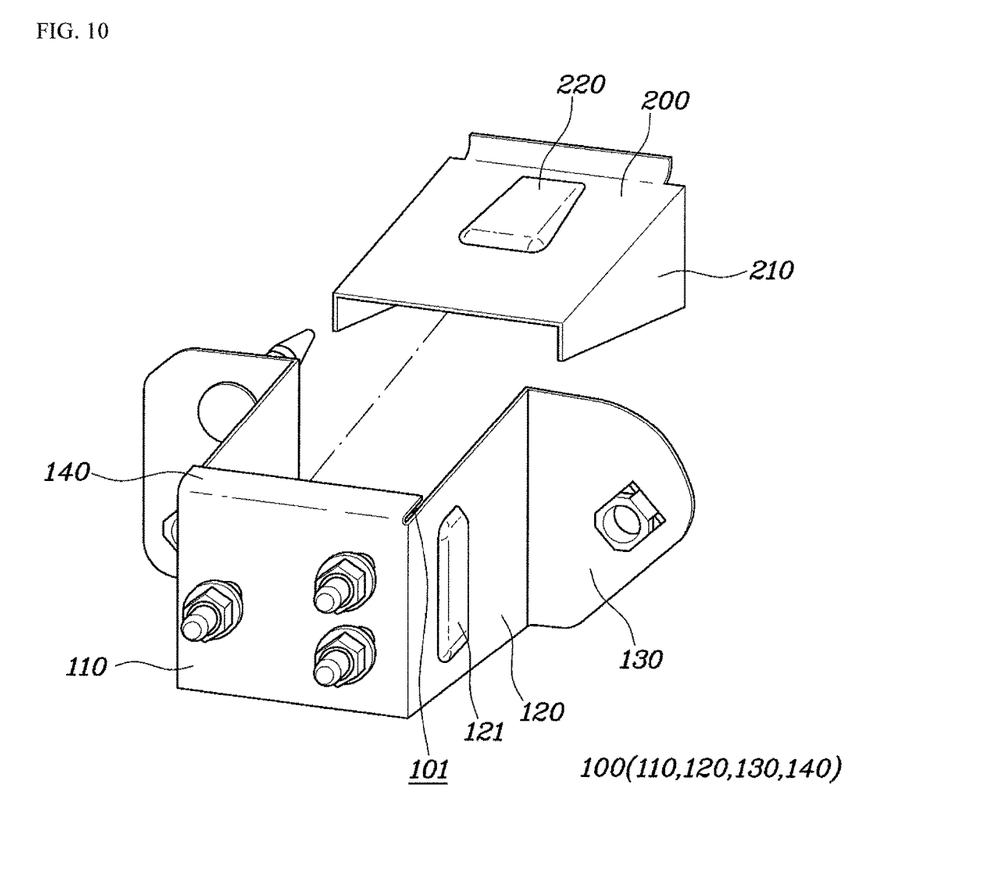
FIG. 10 is a perspective view showing a crash box for a vehicle according to another exemplary embodiment of the present invention.

FIG. 10 is a perspective view showing a crash box for a vehicle according to another exemplary embodiment of the present invention.

As shown in FIG. 10, the connecting body 100 according to another exemplary embodiment of the present invention may further include insertion portions 140 that are formed by being bent and extending at the upper and lower end portions of the connecting body, respectively, to form insertion slits 101 for allowing front end portions of the connecting plates 200 to be inserted thereto.

Accordingly, the connecting plate 200 can be easily assembled to improve productivity, and durability can be improved by increasing the bonding force.

Figure 11:
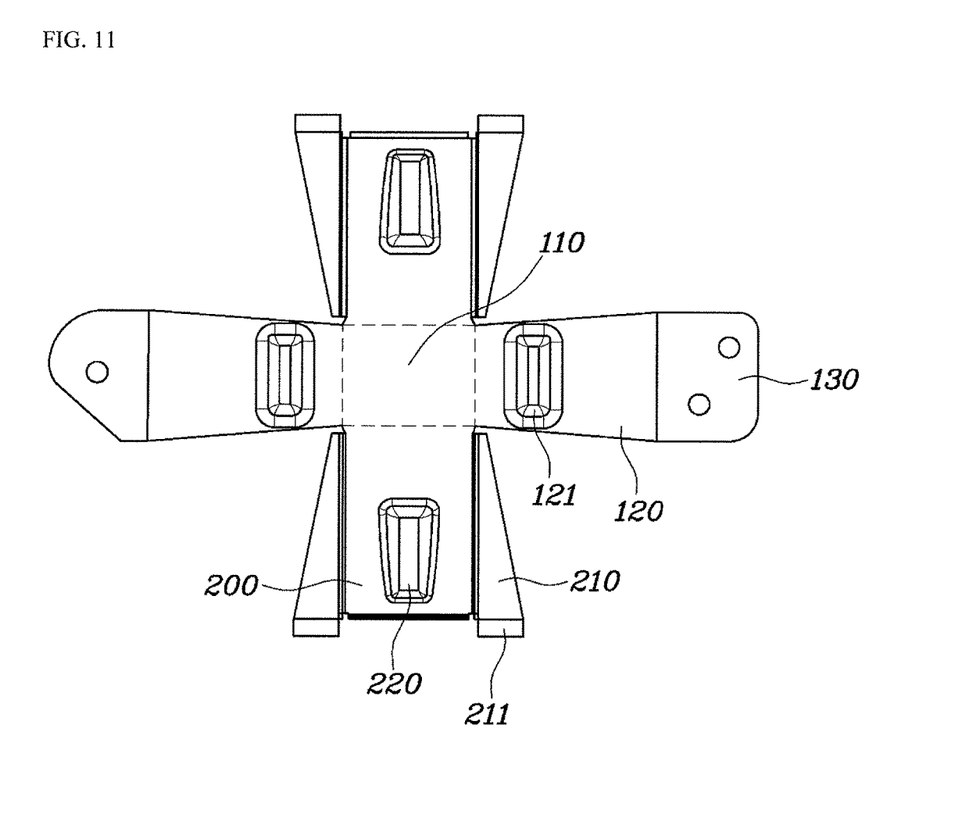
FIG. 11 is an exploded view showing a crash box for a vehicle according to a further exemplary embodiment of the present invention.

FIG. 11 is an exploded view showing a crash box for a vehicle according to a further exemplary embodiment of the present invention.

As shown in FIG. 11, according to the further embodiment of the present invention, a pair of connecting plates 200 may be integrally formed on sides where the side connecting portions 120 are not connected to the front coupling portion 110, to be bent to face each other.

Accordingly, it is possible to omit a separate welding process for coupling the connecting plate 200 to the connecting body 100, facilitating mass production and shortening the assembly time.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crash box for a vehicle, which mediates a back beam and a side member disposed in a width direction of the vehicle and absorbs crash energy when a crash occurs, the crash box comprising:
   a connecting body including a front coupling portion coupled to the back beam, a pair of first and second side connecting portions bent from the front coupling portion to face each other, and a rear coupling portion extending from an end portion of each of the first and second side connecting portions by being bent to be coupled to the side member; and
   a pair of connecting plates coupled to open upper and lower end portions of the connecting body, respectively,
   wherein each of the connecting plates is provided with an overlap portion that is formed by being bent and extending from each of a first opposite side and a second opposite side of the connecting plates to contact with an internal surface of an associated side connecting portion of the first and second side connecting portions.

2. The crash box of claim 1, wherein each of the first and second side connecting portions is in a trapezoidal shape, with a width thereof increasing from the front coupling portion to the rear coupling portion.

3. The crash box of claim 2, wherein each of the connecting plates is formed to be in a shape corresponding to the open upper and lower end portions of the connecting body, wherein front and opposite side end portions thereof are respectively coupled to the front coupling portion and the pair of first and second side connecting portions.

4. The crash box of claim 1, wherein the overlap portion is in a trapezoidal shape, with a width thereof increasing from the front coupling portion to the rear coupling portion.

5. The crash box of claim 4, wherein the overlap portion includes a rear bent surface formed by being bent and extending toward the rear coupling portion to contact with a rear surface of the rear coupling portion.

6. The crash box of claim 4, wherein the overlap portion includes:
   a first overlap portion contacting with the first side connecting portion that is disposed toward a center of a width direction of the vehicle; and a second overlap portion contacting with the second side connecting portion that is disposed toward an outside of the vehicle,
   wherein an area of the first overlap portion is greater than an area of the second overlap portion.

7. The crash box of claim 1, wherein each of the connecting plates is provided with a reinforcing protrusion protruding from the front coupling portion toward the rear coupling portion wherein the reinforcing protrusions of the connecting plates face each other in a first direction.

8. The crash box of claim 1, wherein each of the first and second side connecting portions is provided with a guide protrusion that is adjacent to the front coupling portion and is configured to protrude in a width direction of the vehicle, to guide strain.

9. The crash box of claim 1, wherein the connecting body is provided with insertion portions that are formed by being bent and extending at the open upper and lower end portions of the connecting body, respectively, to form insertion slits for allowing front end portions of the connecting plates to be inserted thereinto.

10. The crash box of claim 1, wherein the connecting plates are integrally formed on sides where the first and second side connecting portions are not connected to the front coupling portion, to be bent to face each other.

* * * * *